June 11, 1968   H. A. HADLEY   3,387,898

WEIGHING SCALE BEARING STRUCTURE

Filed June 23, 1964

INVENTOR
HARLAN A. HADLEY

BY  *Sherman & Shalloway*

ATTORNEYS

United States Patent Office 3,387,898
Patented June 11, 1968

3,387,898
WEIGHING SCALE BEARING STRUCTURE
Harlan A. Hadley, P.O. Box 147,
Burlington, Vt. 05401
Filed June 23, 1964, Ser. No. 377,255
1 Claim. (Cl. 308—2)

This invention relates to knife-edge bearings, and relates more particularly to knife-edge bearings employed in weighing scales.

In many weighing mechanisms, levers are supported and the forces are transmitted to and from the levers by means of knife-edge pivot and bearing assemblies in which the knife-edge pivot rests in a suitably mounted bearing provided with a V-groove. The V-groove normally positions the pivot in a longitudinal plane and anti-friction plates applied to the end of the bearing block normally restrain the pivot from endwise motion. As is well known, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife-edge pivot, the knife-edge pivot "skates" over the surface of the flattened bottom of the V-groove causing the lever to assume readily a different balance or zero position for every different position of the knife-edge pivot on the radius portion of the V-groove. The movement of the pivot relative to the radius portion of the V-groove alters in effect to the pivot distances, resulting in inaccuracies in the weighing.

It is an important object of this invention to provide a bearing for a weighing scale knife-edge pivot which will be free from the above-mentioned and other disadvantages of the prior art devices and which will be especially simple in construction, inexpensive to produce, and efficient in use.

Another object of this invention is the provision of a bearing structure wherein a plurality of bearings support the knife-edge pivot in an advantageous manner.

Still another object of this invention is to provide a sensitive bearing structure wherein independently supported bearings cooperate to form a V-bearing for supporting a knife-edge pivot.

A further object of this invention is the provision in a weighing scale of self-aligning bearing structures for supporting on their surfaces a knife-edge pivot.

Another object of this invention is the provision of a knife-edge pivot and bearing assembly which provides a positive positioning device for the lever and which keeps the knife-edge wear at a minimum thus maintaining the accuracy and sensitivity of the instrument over a long period of time.

A further object of this invention is the provision of a novel bearing assembly which not only provides rolling friction for the knife-edge but also lends horizontal stability to the lever which carries the knife edge.

Still another object of this invention is the provision of a novel bearing assembly which eliminates the transverse friction by allowing the bearings to move with the knife edge.

Other objects of this invention, together with certain details of construction and combinations of parts, will be apparent from the following description when taken in conjunction with the drawing wherein.

Like reference numerals indicate like parts throughout the several views of the drawing.

Figure 2:
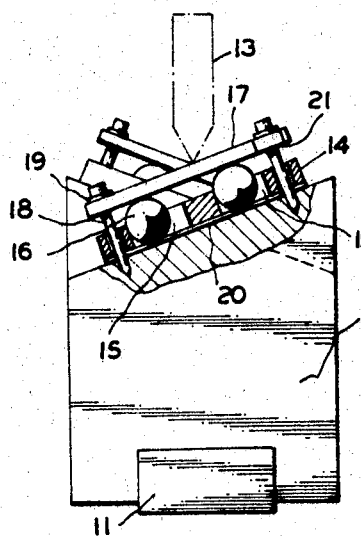
FIGURE 2 is a side view of the apparatus shown in FIGURE 1.
Figure 1:
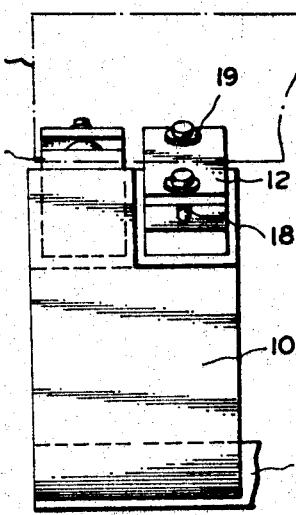
FIGURE 1 is an elevational view showing the bearing elements of the preferred embodiment of my invention mounted on a fulcrum stand.
Figure 1:
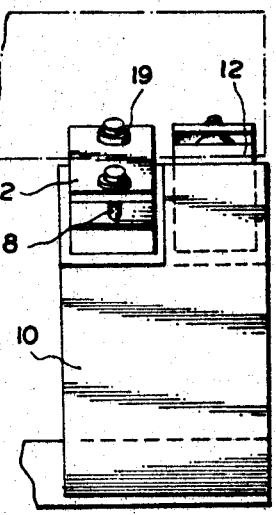

Referring now to the drawings for a detailed description of my invention, and particularly to FIGURES 1 and 2, the reference numeral 10 indicates a fulcrum stand of a weighing scale mounted on a cross supporting member 11. Four bearing holders, each generally designated by reference numeral 12 are mounted upon fulcrum stand 10. As shown in FIGURES 1 and 2, the bearing holders are preferably mounted on the fulcrum stand in pairs and arranged so that the bearing surfaces are oppositely inclined to the horizontal axis. Two such pairs support a knife-edge pivot 13 of a lever (not shown).

As is clearly shown in FIGURE 2, each bearing holder includes a retaining plate 14 provided with oblong holes 15. Each of the holes 15 is adapted to receive a ball 16 and a flat bearing plate 17 is seated on the balls 16. The bearing plate is operatively secured to the retaining plate 14 by means of headed pins 18 provided with washers 19, said pins passing through apertures in both the bearing plate and the retaining plate 14. The retaining plate 14 is preferably slightly spaced from the fulcrum stand by a thin steel plate 20 which provides a smooth rolling surface for the balls 16.

In accordance with this invention, the apertures 21 in bearing plate 17 are of a larger diameter than that of the pins 18 passing therethrough. Thus, the bearing surfaces and the knife-edge pivot are always in proper alignment since the bearing plates 17 are free to move into position where the knife edge is ideally supported. Accordingly, the instant arrangement of bearings is self-aligning.

In FIGURES 3–6, a modification of my invention is shown. Four bearing holders (two shown), each generally designated by reference numeral 22 are pivotally mounted upon fulcrum stand 23 in slots 24 by means of pins 25. As shown clearly in FIGURE 4, the bearing holders are preferably mounted in the fulcrum stand in pairs and arranged so that the bearing surfaces are oppositely curved to the horizontal axis. Each bearing holder 22 is preferably formed of sheet metal and includes a rocker arm 26 and a curved bearing 27.

Figure 4:
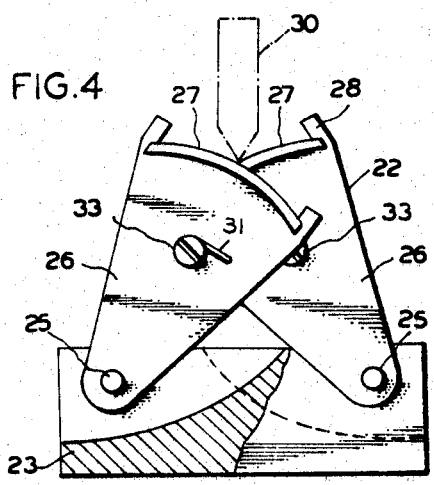
FIGURE 4 is a side view of the apparatus shown in FIGURE 3.
Figure 5:
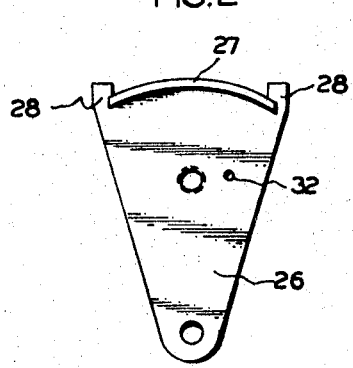
FIGURE 5 is a side view of one of the rocker arms shown in FIGURE 4.
Figure 6:
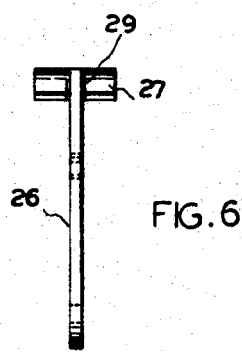
FIGURE 6 is an end view of the rocker arm shown in FIGURE 5.

As is clearly shown in FIGURES 4 and 5, each rocker arm includes projecting tabs 28 at each side thereof. The curved bearings are provided with opposed slots 29 at their sides of a size to accommodate tabs 28 so that bearing 27 may be slipped into position with its lower surface resting upon the curved top surface of the rocker arm 26. Tabs 28 may be provided with protuberances which, while allowing bearing 27 to be slipped down into position, will prevent inadvertent removal of the bearing. Preferably, the slots 29 in bearing 27 are slightly wider than the width of tabs 28 to permit limited play of bearing elements 27 relative to the respective bearing holder upon contact with knife-edge pivot 30 (FIGURE 4).

Figure 3:
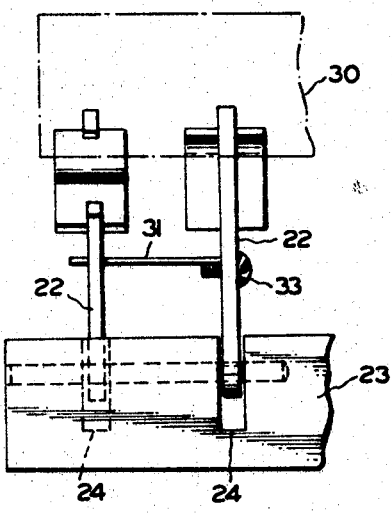
FIGURE 3 is an elevational view showing the bearing elements of another embodiment of my invention.

As shown in FIGURES 3 and 4, the rocker arms 26 are secured in pairs by means of a thin pin or wire 31, passing through apertures 32, in said rocker arms. Preferably, one end of the wire 31 is secured to one of the rocker arms by means of headed screw 33. In accordance with this invention, each bearing holder 22 forms a true radius from its point of rotation to where it touches the knife edge 30. Hence, it will be appreciated that by employing such a bearing device, if the bearings 27 change relative to the knife edge, this will not shift the lever position so that a more constant performance can be expected. Therefore, with this bearing, it is possible to construct an equal arm balance with stabilized platforms having a capacity of 2 kilograms with a sensitivity of 5 milligrams at full load. That is, 1 part in 400,000.

The embodiment of my invention shown and described herein is to be considered merely as illustrative, as my invention is susceptible to variation, modification and change within the spirit and scope of the appended claim.

What is claimed is:

1. A knife-edge bearing for weighing scales comprising a fulcrum stand, a plurality of independently supported self-aligning bearings arranged in spaced pairs, the bearing of each pair being oppositely inclined and cooperating to form a V-bearing, and a holder for each bearing, said holders each including a retaining plate provided with oblong holes and balls positioned within said holes, said bearings being seated on the balls and operatively secured to the retaining plate by means of headed pins provided with washers, said pins passing through apertures in the bearing and retainer plate, and the said retaining plate and balls maintaining the inclined bearing above said fulcrum stand, said apertures in the bearing plate being of a larger diameter than that of the pins passing therethrough, thereby providing self-alignment of the bearing relative to the knife edge.

References Cited

UNITED STATES PATENTS

| | | | |
|---|---|---|---|
| 693,847 | 2/1902 | Doering. | |
| 2,200,141 | 5/1940 | Wirth | 308—2 |
| 2,565,644 | 8/1951 | Best | 308—15 X |
| 2,857,764 | 10/1958 | Frank. | |
| 3,072,209 | 1/1963 | Perry | 308—3 X |
| 3,160,219 | 12/1964 | Meier | 308—2 X |

FOREIGN PATENTS

| | | |
|---|---|---|
| 834,057 | 11/1938 | France. |
| 235,929 | 12/1944 | Switzerland. |

MARTIN P. SCHWADRON, *Primary Examiner.*

DAVID J. WILLIAMOWSKY, *Examiner.*

L. L. JOHNSON, *Assistant Examiner.*